US007069593B1

(12) United States Patent
Gerbault

(10) Patent No.: US 7,069,593 B1
(45) Date of Patent: Jun. 27, 2006

(54) DEVICE AND METHOD FOR MAKING SECURE AN INTEGRATED CIRCUIT

(75) Inventor: Eric Gerbault, Cachan (FR)

(73) Assignee: Axalto S.A., Meudon Cedex (FR)

( * ) Notice: Subject to any disclaimer, the term of this patent is extended or adjusted under 35 U.S.C. 154(b) by 0 days.

(21) Appl. No.: 09/830,378

(22) PCT Filed: Oct. 28, 1999

(86) PCT No.: PCT/FR99/02639

§ 371 (c)(1),
(2), (4) Date: May 29, 2002

(87) PCT Pub. No.: WO00/26869

PCT Pub. Date: May 11, 2000

(30) Foreign Application Priority Data

Oct. 29, 1998 (FR) ................................... 98 13606

(51) Int. Cl.
- G06F 7/04 (2006.01)
- G06F 17/30 (2006.01)
- G06K 9/00 (2006.01)
- H04K 1/00 (2006.01)
- H04L 9/00 (2006.01)

(52) U.S. Cl. ........................................ 726/26; 713/189
(58) Field of Classification Search ................ 713/190, 713/193

See application file for complete search history.

(56) References Cited

U.S. PATENT DOCUMENTS

| 4,847,803 A | 7/1989 | Miyano |
| 5,452,431 A | 9/1995 | Bournas |

FOREIGN PATENT DOCUMENTS

| EP | 0 595 720 | 5/1994 |
| EP | 0 681 233 | 11/1995 |

OTHER PUBLICATIONS

Kuhn et al., "Design Principles for Tamper-Resistant Smartcard Processors," Proceedings of the USENIX Workshop on Smartcard Technology (Smartcard '99), May 1999. pp. 1-12.*

* cited by examiner

Primary Examiner—Gilberto Barrón, Jr.
Assistant Examiner—Christopher J. Brown
(74) Attorney, Agent, or Firm—Cohen, Pontani, Lieberman & Pavane

(57) ABSTRACT

The present invention relates to an integrated circuit device containing a memory area, which comprises, on the one hand, a data memory and a program memory, and on the other hand, a program having N code blocks Bi (i=1, . . . , N). It also relates to a method for making such a device secure. The present invention is characterized in that the memory area has M replicas Cj (j=1, . . . , M) of x program code blocks Bi (x=1, . . . , N), which replicas reside at different addresses in said memory area, and in that said device has selection means for randomly selecting one replica Cj of at least one of the x blocks Bi, as a block replica to be used when executing said program. In particular, the present invention can be applied to smart cards.

8 Claims, 4 Drawing Sheets

DEVICE AND METHOD FOR MAKING SECURE AN INTEGRATED CIRCUIT

This application is a U.S. National Phase Application under 35 USC 371 of International Application PCT/FR99/02639 (not published in English) filed 28 Oct. 1999.

FIELD OF THE INVENTION

The present invention relates to an integrated circuit device containing a memory area, which comprises, on the one hand, a data memory and a program memory, and on the other hand, a program having n code blocks $B_i$ ($i=1, \ldots, N$). It further relates to a method for making such a device secure.

BACKGROUND OF THE INVENTION

Integrated circuit devices of this kind are most often used in applications where confidential information storing and processing security is essential. These can for example be electronic component-carrying cards for applications relating to the fields of health, mobile telephony, or also banking applications.

Such cards comprise an integrated circuit which conventionally includes a controller for (for example a central processing unit or CPU) managing and distributing, through bus lines, data or address information that is stored within the memory area of said cards. This integrated circuit having bus lines consumes electrical power, in particular when these bus lines are used to carry logical 1 information.

Also, the intensity of the electrical current used by an electronic component-carrying card varies with time, in particular because of the different values of data or addresses transiting over said bus lines in the card. The current change as a function of time is an electrical signature of the card's activity and therefore, analyzing said signature is indicative of said activity. Thereby, by means of an analysis of the electrical signature, forgers, for example, can easily follow a succession of operations contained in the different code blocks of the program of said card and therefore, can access the confidential information contained in this card.

In order to make the analysis of the electrical signature more complex to forgers, the state of the art suggests providing auxiliary devices for generating spurious signals that are added to the electrical signature of said electronic component-carrying card's activity. Although they make the electrical signature analysis more delicate, such auxiliary devices are slow because they monopolize some of the card's resources, which resources are already used for executing other operations specific to the card and consume more current because they include electronic components that require electrical power for their operation.

SUMMARY OF THE INVENTION

Thus, one technical problem to be solved by the present invention is that of providing an integrated circuit device containing a memory area that comprises, on the one hand, a data memory and a program memory, and on the other hand, a program having N code blocks $B_i$ ($i=1, \ldots, N$), as well as a method for making such a device secure, for obtaining an electrical signature in such a way that said signature is difficult to analyze and which further requires little power and time consumption, for example due to auxiliary devices appropriating the device's own resources.

According to a first object of the present invention, a solution to the technical problem posed is characterized in that said memory area of said integrated circuit device comprises M replicas $C_j$ ($j=1, \ldots, M$) having x program code blocks $B_i$ ($x=1, \ldots, N$), said replicas residing at different addresses within said memory area, and in that said device comprises selection means for randomly selecting a replica $C_j$ of at least one of the x blocks $B_i$, as a block replica to be used when executing said program.

According to a second object of the present invention, this solution is characterized in that the securing method comprises the steps of:

creating, within said memory area, M replicas $C_j$ ($j=1, \ldots, M$) of x program code blocks $B_i$ ($x=1, \ldots, N$), wherein said replicas reside at different addresses within said memory area, and randomly selecting one replica $C_j$ of at least one of the x blocks $B_i$, as a block replica to be used when executing said program.

Therefore, as explained in detail below, the device according to the invention prevents forgery by making the analysis of the electrical signatures very difficult to analyze by such forgery, taking advantage of the fact that said electrical signature varies, in particular, as a function of the values transiting over said device bus lines.

BRIEF DESCRIPTION OF THE DRAWINGS

Other features and advantages of the invention will become apparent from the following description of preferred embodiments of the present invention, provided by way of non-limiting examples, in reference to the appended Figures, in which.

DETAILED DESCRIPTION OF THE DRAWINGS

Figure 1:
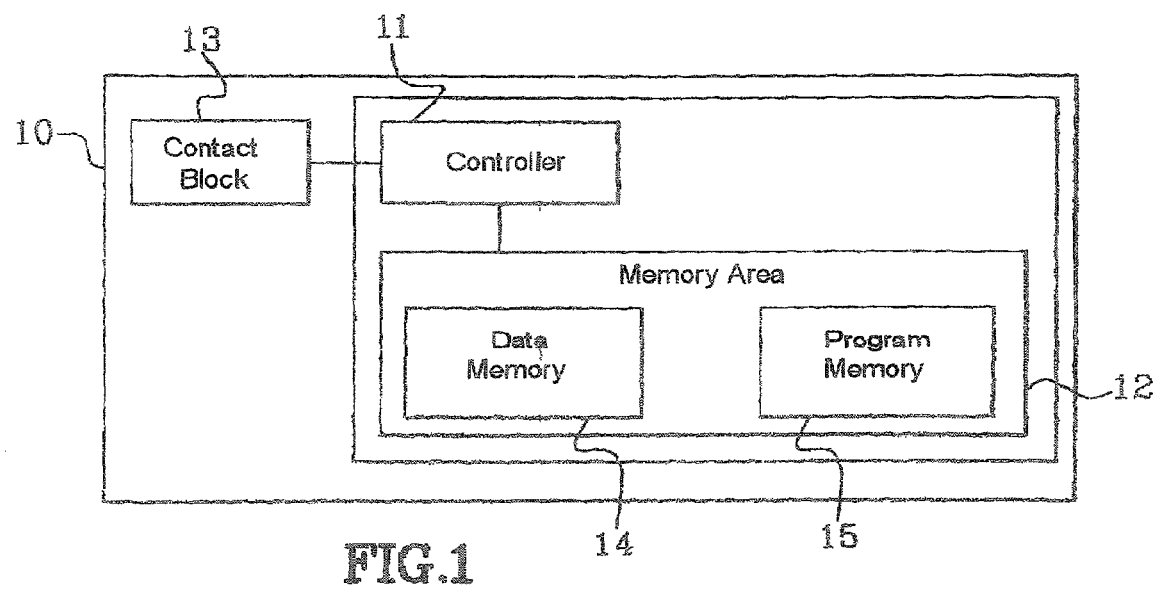
FIG. 1 illustrates an integrated circuit device, such as, for example, an electronic component-carrying card.

FIG. 1 shows an integrated circuit device 10, for example an electronic component-carrying card.

Card 10 includes a controller (for example a central processing unit or CPU), a memory area 12 including a data memory 14 and a program memory 15, and a terminal block 13 for electrical connection, for example, to a card reader connector.

Figure 2:
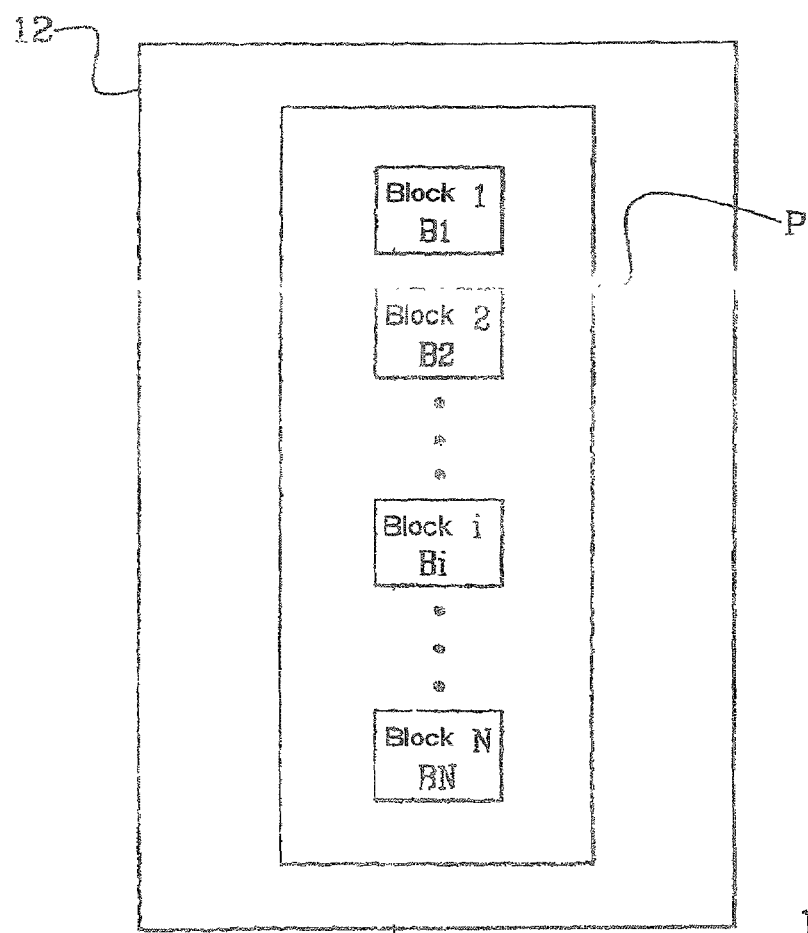
FIG. 2 illustrates a memory area in the card of FIG. 1.

Memory area 12 is shown in FIG. 2. It contains a program P including N code blocks $B_i$ ($i=1, \ldots, N$) forming code blocks representing steps or operations to be performed when executing said program P, which enables performing operations such as reading or selecting data from card 10 and wherein said blocks $B_i$ handle data and address information.

Figure 3:
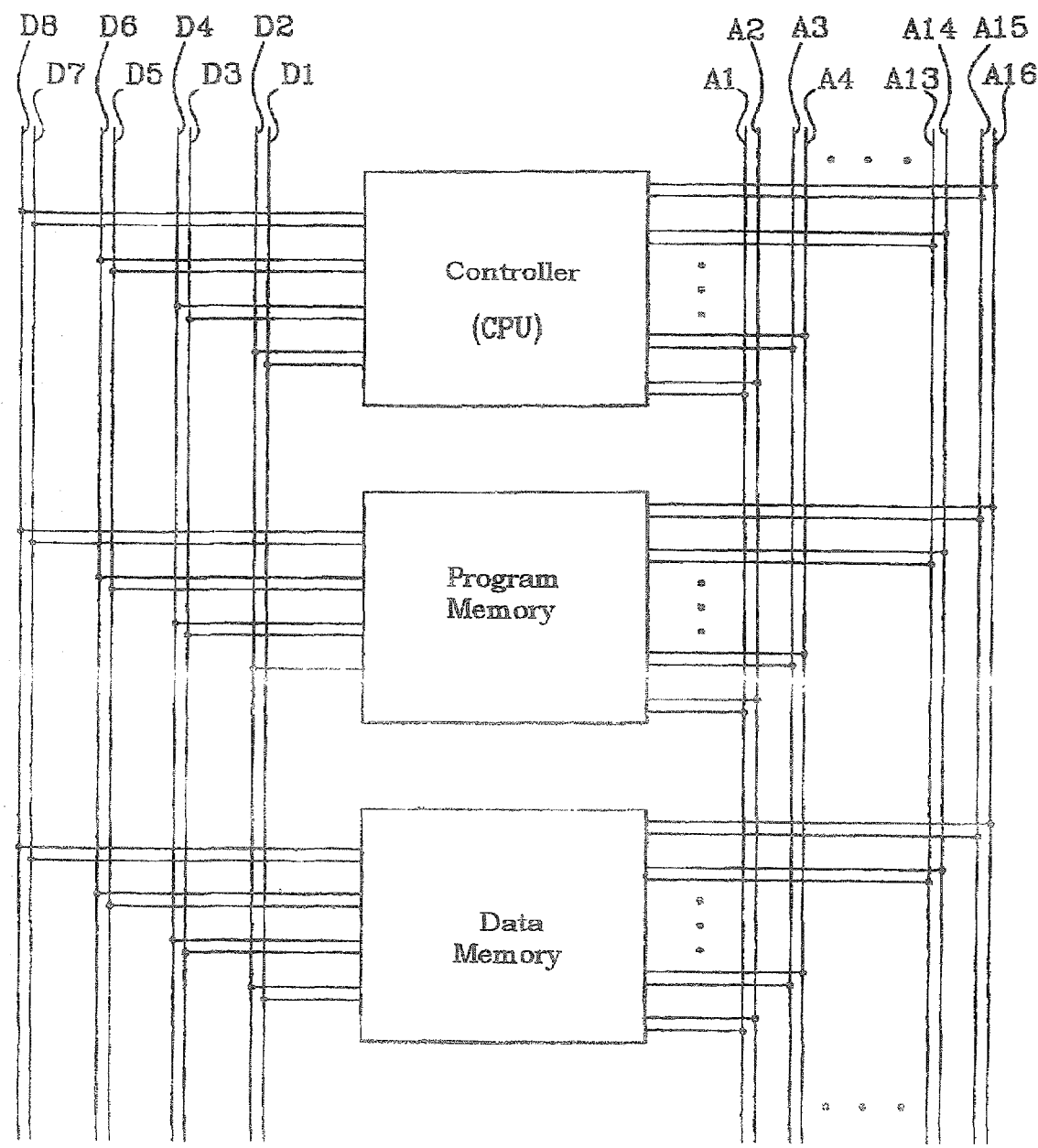
FIG. 3 illustrates bus lines in the card of FIG. 1.

When executing program P, information interchanges take place between memories 14, 15 and controller 11, through bus lines within said integrated circuit, which are handled by controller 11 in said card 10. The bus lines are either lines for transferring address information, or lines for transferring data information. As shown in FIG. 3, data bus lines D1, D2, . . . , D8 and address bus lines A1, A2, . . . , A16 are connected to each of the data memory 14 and program memory 15 within each memory area 12 as well as to controller 11 (CPU).

Figure 4:
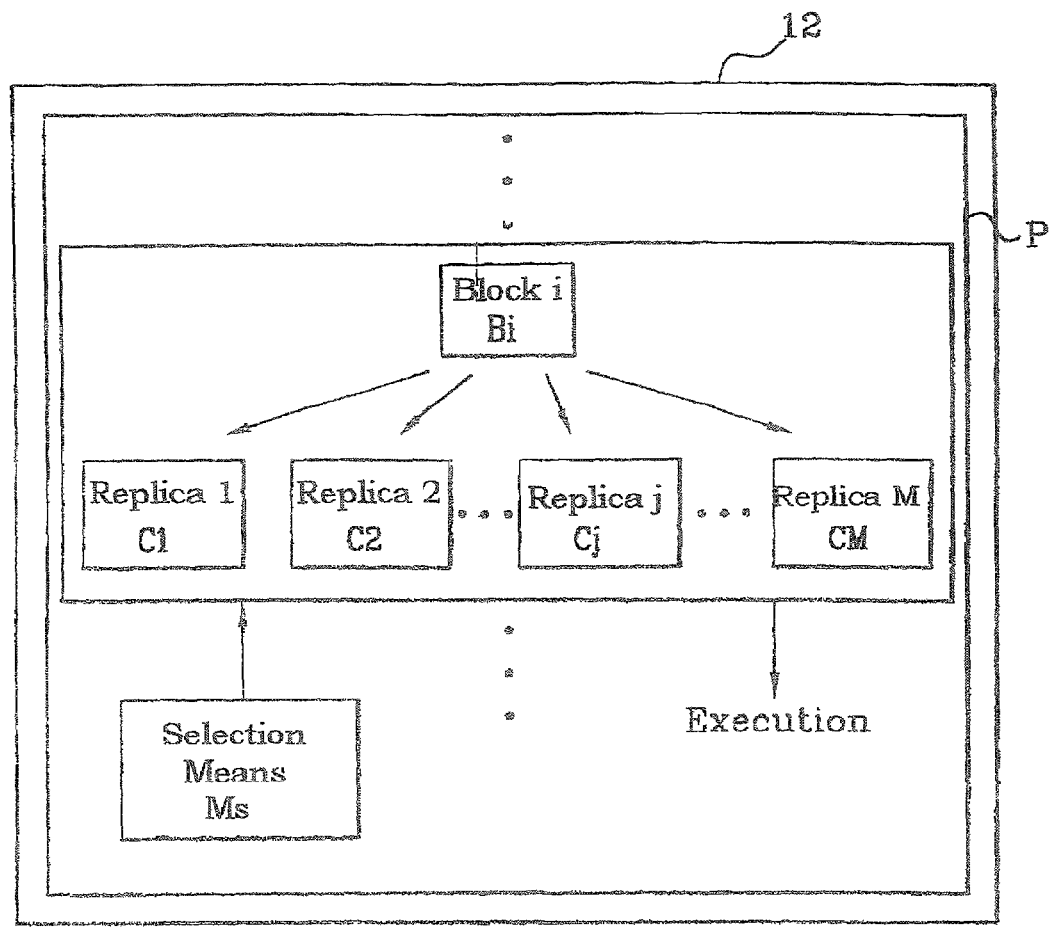
FIG. 4 illustrates the memory area of FIG. 2 restricted to code block $B_i$.

In order to scramble the analysis of the electrical signature on execution of program P, which execution is a sign of card 10 being active, according to the present invention, the device comprises M replicas Cj (j=1, . . . , M) of one or several blocs Bi within said memory area 12, and selection means Ms for randomly selecting one of replicas Cj of a block Bi as a block replica to be executed when the latter must be executed within said program P. When program P is executed, several code blocks Bi will be executed. FIG. 4 illustrates an example for a given block Bi. For each execution of this block Bi to be executed within program P and including replicas Cj within memory area 12, selection means Ms randomly selects either block Bi or one of its replicas Cj so as to execute it within program P. As the various replicas Cj as well as block Bi reside at different address values, on each new request for executing block Bi within program P, the bus lines do not carry the same address values and this makes analyzing the electrical signature, which varies according to the values transiting over the bus lines in card 10, much more difficult. The more replicated blocks Bi this device includes, the more difficult the signature will be to analyze. This is the reason why the invention provides replicas Cj for x blocks Bi (x=1, . . . , N).

Figure 5:
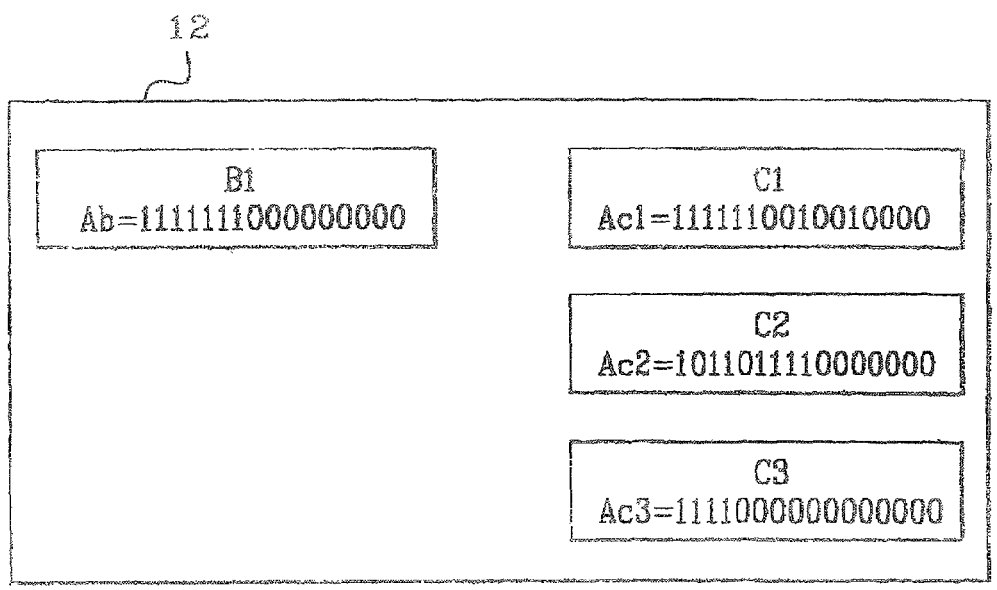
FIG. 5 illustrates addressing of a code block and its replicas within the card of FIG. 1.

In particular, the electrical signature varies as a function of the values transiting over the address bus lines shown in FIG. 3, and more specifically, whenever information 1 is present on a bus line, which information requires a certain electrical current. However, if address values of the above-mentioned replicas Cj and said replicated block Bi are equivalent in terms of electrical consumption (for example their values 1111100000000000 and 0000111011000000 induce the same consumption since they each have the same number of bits equal to one and zero), the electrical signature will not change much. Thus, addresses are selected in such a way that the sum of bit values of at least two addresses among the set of addresses of a replicated block Bi and its M replicas Cj are different. In practice, it has been found that, generally speaking, a 1-bit difference among these sums was sufficient for differentiating the various electrical consumption amounts of the address values and therefore make the analysis of the electrical signature more complex. The example illustrated in FIG. 5 shows a block Bi with its three replicas C1, C2 and C3 and their respective addresses Ab, Ac1, Ac2 and Ac3. In this example, it can be seen that the bit sums of address values Ab, Ac1, and Ac3 are different and therefore, that the address values vary in electrical consumption whereas the bit sums of address values Ab and Ac2 are equivalent (with their sum equal to seven) and that, as a consequence, their address values are equivalent in terms of electrical consumption.

Just as the electrical signature varies according to the values transiting over the address bus lines, the electrical signature varies according to the values transiting over the data bus lines shown in FIG. 3.

Figure 6:
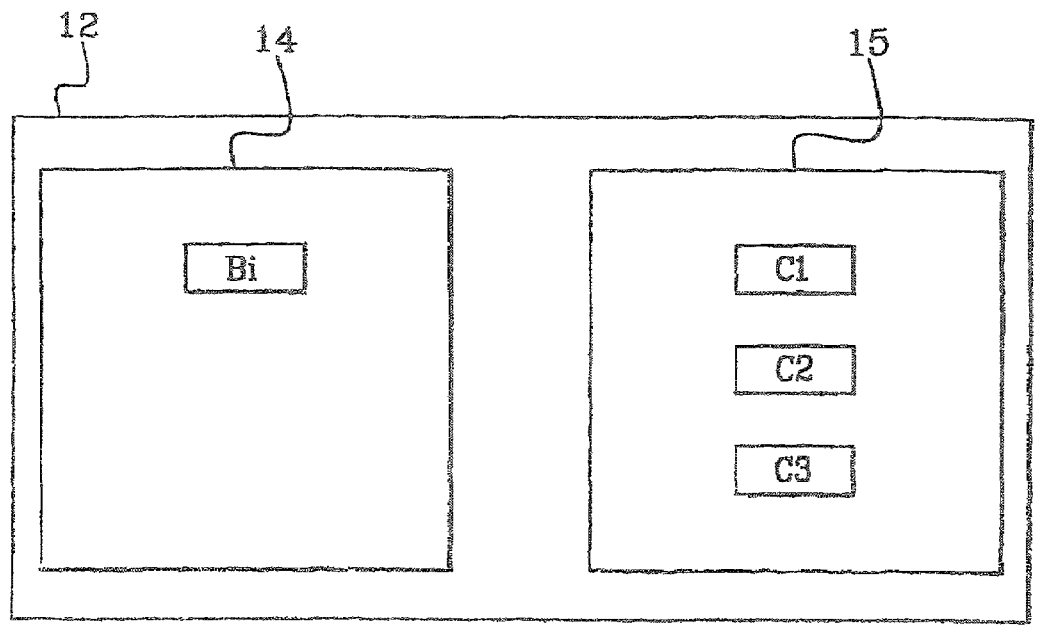
FIG. 6 illustrates a distribution of a code block and its replicas within a memory area of FIG. 2.
Figure 7:
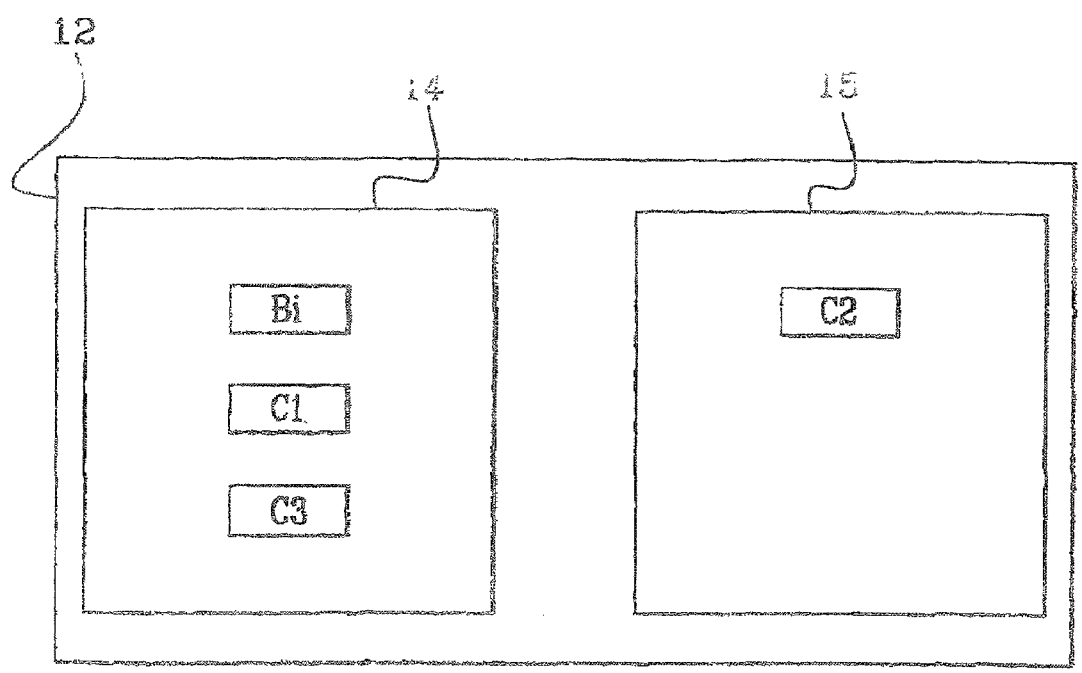
FIG. 7 illustrates another distribution of a code block and its replicas within the memory area of FIG. 2.

Thus, according to the present invention, among the set of addresses within a replicated block Bi and its M replicas (where block Bi includes operations for managing a given number of data), an address resides within program memory 15 and another address resides within data memory 14, as shown in the examples of FIGS. 6 and 7. In this respect, the execution of an operation, for example a read or write operation, residing in program memory 15, does not consume the same amount of current as when said operation resides in data memory 14. Operations of the replicated block Bi are seen from card controller 11 as data information transiting over the data bus lines.

Therefore, the above-mentioned system, where blocks are replicated within different memories, enables scrambling of the electrical signature, and it will be understood that this system, in combination with what has been described so far, makes the electrical signature even more difficult to analyze.

Finally, in addition to a random variation of the electrical signature due to the different systems provided within the device according to the present invention and as disclosed previously, the latter provides a random time variation of said signature. More specifically, the present invention provides a device comprising controller means for randomly scheduling the execution of blocks Bi. Each block comprises a set of operations relating to the electronic component-carrying card. These operations, when executed, invoke functions that are managed by card controller 11. For performing these functions, the controller takes time. In general, for each set of functions, the time consumed will be different, which is also the case for each set of operations. Thus, when using this controller means for random execution of blocks, on each new execution of program P, the electrical signature will vary in time since the code blocks are not executed in the same order, whereby, for example, a forger will not be able to repeatedly launch the execution of said program P and analyze the electrical signature in order to find matches between various processing operations and each signal or series of signals contained within the electrical signature. It will be noted that no auxiliary device has been added for countering such forgery.

I claim:

1. An integrated circuit device containing a memory area that comprises, a data memory, a program memory, and a program having N code blocks, N being an integer greater than 1,
    characterized in that said memory area has M replicas, M being an integer greater than 1, of x program code blocks, x being an integer comprised between 1 and N, wherein said replicas reside at different addresses within said memory area, and in that said device comprises selection means for randomly selecting one replica of at least one of the x blocks as a block replica to be used when executing said program, and
    further characterized in that the sums of bit values of at least two addresses among the set of addresses of one replicated block and its M replicas are different.

2. An integrated circuit device containing a memory area that comprises, a data memory, a program memory, and a program having N code blocks, N being an integer greater than 1,
    characterized in that said memory area has M replicas, M being an integer greater than 1, of x program code blocks, x being an integer comprised between 1 and N, wherein said replicas reside at different addresses within said memory area, and in that said device comprises selection means for randomly selecting one replica of at least one of the x blocks as a block replica to be used when executing said program, and
    further characterized in that, among the set of addresses of one replicated block and its M replicas, one address resides within the program memory and another address resides within the data memory.

3. A device according to claim 2, characterized in that the device comprises controller means for randomly scheduling block execution.

4. A method for making secure an integrated circuit device containing a memory area that comprises, a data memory, a program memory, and a program having N code blocks, N being an integer greater than 1, characterized in that said method comprises the steps of:
generating, within said memory area, M replicas, M being an integer greater than 1, of x program code blocks, x being an integer comprised between 1 and N, wherein said replicas reside at different addresses within said memory area,
randomly selecting one replica of at lease one of the x blocks as a block replica to be used when executing said program, and
selecting the sums of bit values of at least two addresses among the set of addresses of one replicated block and its M replicas in such a way that they are different.

5. A method for making secure an integrated circuit device containing a memory area that comprises, a data memory, a program memory, and a program having N code blocks, N being an integer greater than 1, characterized in that said method comprises the steps of:
generating, within said memory area, M replicas, M being an integer greater than 1, of x program code blocks, x being an integer comprised between 1 and N, wherein said replicas reside at different addresses within said memory area,
randomly selecting one replica of at lease one of the x blocks as a block replica to be used when executing said program, and
among the set of addresses of a replicated block and its M replicas, selecting an address within the program memory and selecting another address within the data memory.

6. A method according to claim 5, characterized in that said method comprises the additional step of randomly scheduling block execution.

7. A device according to claim 1, characterized in that the device comprises controller means for randomly scheduling block execution.

8. A method according to claim 4, characterized in that said method comprises the additional step of randomly scheduling block execution.

* * * * *